March 17, 1964    C. DEIBEL ETAL    3,125,739
ELECTRIC CONTROLLER
Filed Oct. 31, 1961
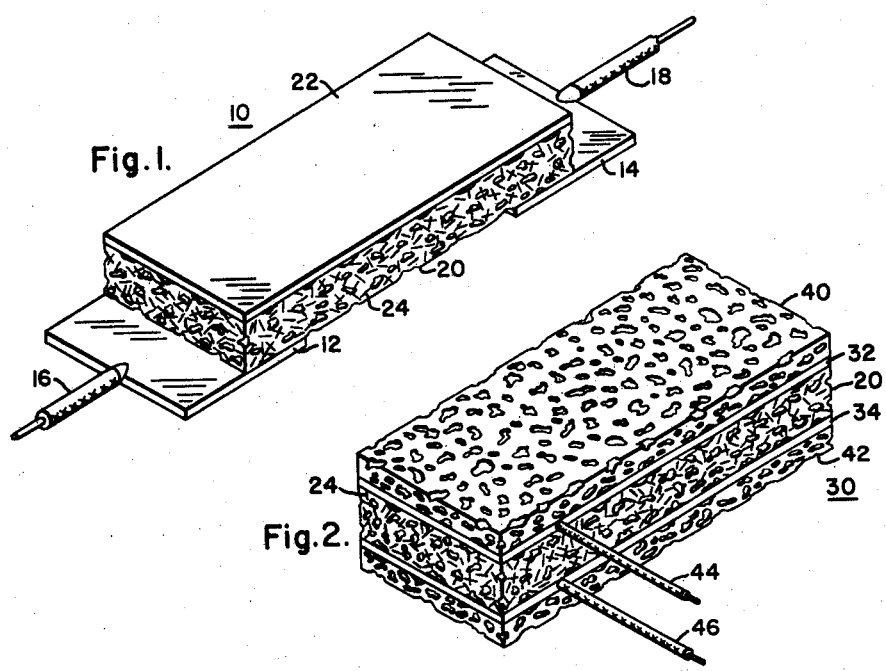
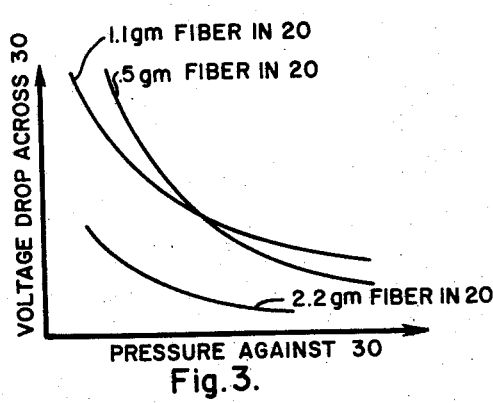
Fig. 3.
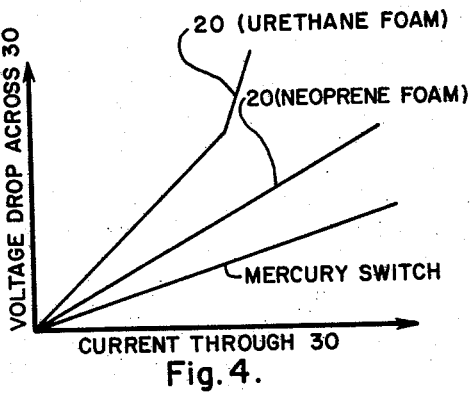
Fig. 4.
WITNESSES:
Bernard R. Gieguy
Edward F. Possessky
INVENTORS
Charles Deibel, Ernest H. Halpern
and Joseph Evanicsko, Jr.
BY
ATTORNEY

United States Patent Office 3,125,739
Patented Mar. 17, 1964

3,125,739
ELECTRIC CONTROLLER
Charles Deibel, Pittsburgh, Joseph Evanicsko, Jr., Jeannette, and Ernest H. Halpern, Monroeville, Pa., assignors to Westinghouse Electric Corporation, East Pittsburgh, Pa., a corporation of Pennsylvania
Filed Oct. 31, 1961, Ser. No. 149,092
9 Claims. (Cl. 338—99)

The present invention relates to arrangements for controlling conductivity in an electric circuit between fully conductive and fully non-conductive conditions.

One of the more fundamental functions commonly provided in an electric circuit is that of providing control of conductivity within the circuit. This includes controlling the continuity of the circuit or switching the circuit between conductive and non-conductive conditions. As a common example, there is the operation provided by a mechanical switch in controlling the transmittal of electric power. This invention encompasses devices operable in providing the switching function on the basis of fundamental phenomena presently ascertained with reasonable certainty but not with the exactitude of academic or mathematical certainty. For an explanation of these phenomena which is more comprehensive than the one to be presented here, reference is to be made to a copending application entitled "Arrangement for Controlling Circuit Conductivity," filed by J. Evanicsko, Jr., October 31, 1961, Serial No. 149,088, and assigned to the present assignee.

In its broadest structural context, the invention comprises a pair of terminal elements serially related to a mass of fibrous material, fibers, or other suitably shaped elements of given conductive and other physical properties as denoted hereinafter. The individual fibers of the mass are located randomly or otherwise within resilient insulative means which are compressible between the terminal elements. When the resilient insulative means and the fibrous mass are compressed, the device exhibits full conductivity so as to provide circuit continuity and when the resilient insulative means and the fibrous mass are permitted to expand the device exhibits full non-conductivity so as to provide a discontinuity in the circuit.

Thus, it is an object of the invention to provide a novel arrangement for controlling the continuity of an electric circuit.

It is another object of the invention to provide a novel arrangement for switching an electric circuit between conductive and non-conductive conditions.

An additional object of the invention is to provide a novel arrangement as disclosed in the second object, with a compressible mass of elements being located within resilient insulative means and with this combination being positioned between two circuit terminals.

These and other objects of the invention will become more apparent upon consideration of the following detailed description along with the attached drawing, in which:

FIGURE 1 is an isometric view of a switching device fabricated in accordance with the principles of the invention;

FIG. 2 is an isometric view of another switching device fabricated in accordance with the principles of the invention;

FIG. 3 is a graphic representation of the various electrical characteristics that can be obtained through variance in the density of a fibrous mass included in the device of FIG. 1 or FIG. 2; and FIG. 4 is a graphic representation of the various electrical characteristics that can be obtained through use of various insulative materials for a resilient insulative member which contains the fibrous mass.

The specific description will now be set forth to illustrate the broad principles of the invention. In FIG. 1, there is illustrated a switching device 10 including a pair of terminals 12 and 14 to which respective power conductors 16 and 18 are connected. Resilient insulative means or a resilient insulative member 20, preferably formed from a porous and resilient material such as an organic polymeric foam, is positioned on the terminals 12 and 14 and under a relatively rigid insulative pressure plate 22. A plurality of conductive elements 24 are located within the insulative member 20. When the pressure plate 22 is pressed with sufficient force against the insulative member 20, conduction is established between the terminals 12 and 14 through the elements 24. A suitable power source (not shown) is, of course, electrically related to the conductors 16 and 18. As can be realized from observation, the elements 24 can be inserted into the flexible insulative member 20 manually or by air pressure spray which provides for considerable manufacturing economy.

The manner in which conduction is established will be more fully understood by reference to the aforementioned copending application, but it will be described here in general terms to the extent necessary for an understanding of this invention. Thus, it has been determined that, when a pair of elements 24 of given conductive properties are engaged with each other current flows through the elements 24 as a function of several variants, noteworthily the pressure producing the engagement and the voltage applied across the elements 24. The material from which the elements 24 are formed is also a significant factor because some degree of conductivity is an essential. For example, metallic materials, such as tungsten, copper, aluminum, Nichrome, nickel and stainless steel are suitable for use in forming the elements 24. The desired resiliency and hardness and desired electrical characteristics are several of the criteria which form a basis for selecting the material to be used for the elements 24 in various applications. The structural form of the elements 24 is shown here generally to be fibrous or wirelike, but as described in the mentioned copending application, other less commonly available structural forms or shapes expectedly are at least suitable for use. In this instance, the elements or fibers 24 are desirably formed from tungsten wire, and have the dimensions, for example, of .005 inch in diameter and about .25 inch in length.

When engagement pressure against adjacent fibers 24 is increased to a predeterminable magnitude, and if sufficient voltage is applied, conduction through these fibers occurs as a result of "breakdown" through an oxide film normally coating the fibers 24. In the device 10, therefore, when sufficient pressure is applied to the plate 22 a multitude of conductive engagements are established between respective fibers 24 so as to provide a plurality of current paths between the terminals 12 and 14.

Once full conduction is established through the fibers 24, a tendency for continued conduction through the establishment of microwelds among the fibers 24 is evidenced. As described in the mentioned copending application, when the fibers 24 are enmassed alone, relatively slight agitation is sufficient to interrupt or break an established conductive path through physical breakage of the formed welds, but it is preferred here to use the resilient insulative member 20 as means for providing the separating forces necessary to accomplish the break.

Thus, when pressure on the plate 22 is removed the inherent resiliency of the insulative member 20 provides sufficient force to separate the fibers 24 and switch the circuit to a non-conductive condition. Subsequently, re-oxidation of the various fibers 24 occurs almost immediately, probably in such rapid fashion because of numerous slight arcing currents which are drawn when separating movement of the fibers 24 is occasioned. Reapplication of pressure to the plate 22 then results in renewed circuit continuity. Since conduction occurs through a path directed longitudinally of the plate 22, it is desirable when conduction is desired that pressure be applied uniformly along the upper face of the plate 22.

With respect to the selection of a material for the insulative member 20, it is noted that there are many types of foam materials available for various applications. Urethane and neoprene foams are examples. In addition, flame retardance can be increased in the selected foam, if desired, by use of chlorinated polyesters or chlorinated phosphates. If relatively high temperatures are expected in a particular application other resins such as high temperature aromatic nylons may be used.

In FIG. 2, there is shown another embodiment of the invention in the form of a switch 30 comprising a pair of terminal strips 32 and 34 and the resilient insulative member 20 positioned between these terminals. The strips 32 and 34 can be flexible, as preferred in some applications. In a manner similar to that in the switch 10, a plurality of the elements or fibers 24 are inserted in the insulative member 20 for enabling a conductive path to be established between the terminal strips 32 and 34. Respective insulative members 40 and 42, in this instance characterized with resiliency, are located, if preferred, against the outer side of the respective terminal strips 32 and 34 to provide electrical isolation of the latter. Conductors 44 and 46 are secured respectively to the terminal strips 32 and 34 for energy transmittal from a voltage source (not shown).

The principles upon which the switch 30 operates are similar to those described in connection with the switch 10. Thus, when pressure is applied against the terminal strip 32 or 34 through the insulative member 40 or 42 so as to compress insulative member 20, conduction is obtained through the fibers 24 if the applied pressure is sufficient in magnitude. Release of the pressure then results in circuit discontinuity.

In this instance, however, pressure can be applied anywhere over the face of the insulative member 40 or 42 (or terminal strips 40 or 42) to obtain conduction. This is because resulting current paths extend perpendicularly to the terminal strips 32 and 34 rather than along these strips as is the case for the terminals 12 and 14 in FIG. 1.

The switch 10 or 30 can be supported or housed in any suitable casing depending upon applicatory needs. Any employed casing should enable pressure to be applied to the switch 10 or 30 and it can be so provided as to allow for momentary or ordinary on-off operation.

There is considerable utility for the switch 10 or 30. As common examples, pads or mats can readily be formed for foot-switching operations, namely, for use as burglar alarms, doorway announcers, door openers, porch-light operators, sewing machine control units, counting units, etc. Hand operated or limit switches can just as readily be formed. Further, the switch 10 or 30 can readily be made waterproof or explosion proof.

In addition to having considerable utility, the switch 10 or 30 provides numerous inherent advantages. For example, it is relatively simple and economic in construction yet reliable in operation. Durability is provided because the only movement of structural elements during switch operation is that which occasions compression and expansion of the insulative member 20. Arcing is conveniently divided into numerous small arcs among many random individual fibers and, therefore, contact wear is not problematical.

By the simple expedient of changing its geometry or the density of the fibers 24 or 36, the switch 10 or 30 can readily be provided with a range of electrical ratings. As another important advantage, the switch 10 or 30 can be made in strip or sheet form of large lengths and surface areas. Accordingly, inventory problems can be lessened because any order for switches of a given size may readily be obtained by cutting the desired size from the switch sheets or strips kept in stock.

As an example of the electrical characteristics of the switch 30, in FIG. 3 there is illustrated a set of curves showing qualitatively the voltage drop across the switch 30 as a function of applied pressure for various amounts of the fibers 24 inserted into the resilient insulative member 20. It is noted that as the fibers 24 in the resilient insulative member 20 are increased the voltage drop across the switch 30 under closed circuit conditions becomes less.

In FIG. 4 there is illustrated a set of curves showing the voltage drop across the switch 30 as a function of the current through the switch 30 for two different materials used in forming the insulative member 20. In addition, this function is shown for an ordinary mercury switch. Each of the presented curves is representative of power consumed in the form of switch which it represents, and it is noted that both the urethane and neoprene switch 30 compare favorably in this regard to an ordinary mercury switch.

In the foregoing description, several physical arrangements have been described to point out the principles of the invention. Theoretical matter has been presented in the interest of clarification and not as a limitation upon the invention. Accordingly, the description has only been illustrative, and it is desired that it be not limited to the specific embodiments described, but rather that it be accorded an interpretation consistent with the spirit and scope of its broad principles.

What is claimed is:

1. An arrangement for controlling the continuity of an electric circuit, said arrangement comprising a pair of spaced suitably supported terminal members between which circuit continuity is to be controlled, compressible insulating means positioned against each of said members, a plurality of conductive metallic elements each normally having an oxide film and being enmassed within said insulating means, means for compressing said insulating means so as to enable conductive engagements to be established among numerous ones of said elements, said terminal members being substantially continuous electrically through said elements and the films thereof when said insulating means are compressed, and said terminal members being substantially discontinuous electrically because of the element films when said elements are actively depressurized by the resilient release force of said insulating means.

2. An arrangement for controlling the continuity of an electric circuit, said arrangement comprising a pair of spaced suitably supported terminal members between which circuit continuity is to be controlled, a compressible insulative foam member positioned against each of said terminal members, a plurality of conductive metallic elements each normally having an oxide film and being enmassed within said foam member, means for compressing said foam member so as to enable conductive engagements to be established among numerous ones of said elements, said terminal members being substantially continuous electrically through said elements and the films thereof when said foam member is compressed, and said terminal members being substantially discontinuous electrically because of the element films when said elements are actively depressurized by the resilient release force of said foam member.

3. An arrangement for controlling the continuity of an electric circuit, said arrangement comprising a pair of spaced suitably supported terminal members between which circuit continuity is to be controlled, compressible insulating means positioned against each of said terminal members, a plurality of conductive metallic fibrous elements each normally having an oxide film and being enmassed within said insulating means, means for compressing said insulating means so as to enable conductive engagements to be established among numerous ones of said fibrous elements, said terminal members being substantially continuous electrically through said fibrous elements and the films thereof when said insulating means are compressed, and said terminal members being substantially discontinuous electrically because of the element films when said elements are actively depressurized by the resilient release force of said insulating means.

4. An arrangement for controlling the continuity of an electric circuit, said arrangement comprising a pair of spaced suitably supported terminal members between which circuit continuity is to be controlled, a compressible insulative foam member positioned against each of said terminal members, a plurality of conductive metallic fibrous elements each normally having an oxide film and being enmassed within said foam member, means for compressing said foam member so as to enable conductive engagements to be established among numerous ones of said fibrous elements, said terminal members being substantially continuous electrically through said fibrous elements and the films thereof when said foam member is compressed, and said terminal members being substantially discontinuous electrically because of the element films when said elements are actively depressurized by the resilient release force of said foam member.

5. An arrangement for controlling the continuity of an electric circuit, said arrangement comprising a pair of suitably supported terminal members spaced along one reference direction, a compressible insulative member having one of its sides positioned against each of said terminal members and extending between said terminal members in said one direction, a plurality of conductive metallic elements each normally having an oxide film and being enmassed within said compressible insulative member, means for compressing said insulative member so as to enable conductive engagements to be established among numerous ones of said elements, said compressing means including a relatively rigid insulative member positioned against the side of said compressible insulative member opposite said one side, said terminal members being substantially continuous electrically through said elements and the films thereof when said rigid insulative member is activated to compress said compressible insulative member, and said terminal members being substantially discontinuous electrically because of the element films when said elements are actively depressurized by the resilient release force of said compressible insulative member.

6. An arrangement for controlling the continuity of an electric circuit, said arrangement comprising a pair of suitably supported terminal members spaced along one reference direction, a compressible insulative member having one of its sides positioned against each of said terminal members and extending between said terminal members in said one direction, a plurality of conductive metallic fibrous elements each normally having an oxide film and being enmassed within said compressible insulative member, means for compressing said insulative member so as to enable conductive engagements to be established among numerous ones of said fibrous elements, said compressing means including a relatively rigid insulative member positioned against the side of said compressible insulative member opposite said one side, said terminal members being substantially continuous electrically through said fibrous elements and the films thereof when said rigid insulative member is activated to compress said compressible insulative member, and said terminal members being substantially discontinuous electrically because of the element films when said elements are actively depressurized by the resilient release force of said compressible insulative member.

7. An arrangement for controlling the continuity of an electric circuit, said arrangement comprising a pair of spaced suitably supported terminal members, a compressible insulative member having opposite ones of its sides respectively positioned against said terminal members, a plurality of conductive metallic elements each normally having an oxide film and being enmassed within said compressible insulative member, means for compressing said compressible insulative member so as to enable conductive engagements to be established among numerous ones of said elements, said terminal members being substantially continuous electrically through said elements and the films thereof when said compressible insulative member is compressed, and said terminal members being substantially discontinuous electrically because of the element films when said elements are actively depressurized by the resilient release force of said compressible insulative member.

8. An arrangement for controlling the continuity of an electric circuit, said arrangement comprising a pair of spaced suitably supported terminal members, a compressible insulative member having opposite ones of its sides respectively positioned against said terminal members, a plurality of conductive metallic elements each normally having an oxide film and being enmassed within said compressible insulative member, means for compressing said compressible insulative member including another insulative member positioned against at least one of said terminal members oppositely of said compressible insulative member, said terminal members being substantially continuous electrically through said elements and the films thereof when said compressible insulating member is compressed, and said terminal members being substantially discontinuous electrically because of the element films when said elements are actively depressurized by the resilient release force of said compressible insulating member.

9. An arrangement for controlling the continuity of an electric circuit, said arrangement comprising a pair of spaced suitably supported terminal members, a compressible insulative member having opposite ones of its sides respectively positioned against said terminal members, a plurality of conductive metallic fibrous elements each normally having an oxide film and being enmassed within said compressible insulative member, means for compressing said compressible insulative member so as to enable conductive engagements to be established among numerous ones of said fibrous elements, said terminal members being substantially continuous electrically through said fibrous elements and the films thereof when said compressible insulative member is compressed, and said terminal members being substantially discontinuous electrically because of the element films when said elements are actively depressurized by the resilient release force of said compressible insulative member.

References Cited in the file of this patent

UNITED STATES PATENTS

| 2,044,080 | Kemper | June 16, 1936 |
| 2,305,717 | La Bell | Dec. 22, 1942 |
| 2,472,214 | Hurvitz | June 7, 1949 |
| 2,489,643 | Hunter | Nov. 29, 1949 |
| 2,596,420 | McGarvey | May 13, 1952 |
| 2,626,381 | Olson | Jan. 20, 1953 |

FOREIGN PATENTS

| 12,510 | Australia | May 9, 1933 |